(12) United States Patent
Pal et al.

(10) Patent No.: US 8,053,106 B1
(45) Date of Patent: Nov. 8, 2011

(54) BATTERY WITH IMPROVED INSULATOR (75) Inventors: Alexandru Z. Pal, Montrose, CA (US);
Clay Kishiyama, San Francisco, CA (US); Eric Villarreal, Las Vegas, NV (US); Paul Berg, Chatsworth, CA (US)

(73) Assignee: Quallion LLC, Sylmar, CA (US)

( * ) Notice: Subject to any disclaimer, the term of this patent is extended or adjusted under 35 U.S.C. 154(b) by 639 days.

(21) Appl. No.: 11/605,987

(22) Filed: Nov. 29, 2006

Related U.S. Application Data (60) Provisional application No. 60/741,498, filed on Dec. 1, 2005.

(51) Int. Cl.
*H01M 2/08* (2006.01)
(52) U.S. Cl. ........................................................ 429/175
(58) Field of Classification Search .................. 429/120, 429/99, 159, 175
See application file for complete search history.

(56) References Cited

U.S. PATENT DOCUMENTS

| | | | | |
|---|---|---|---|---|
| 3,655,456 A | * | 4/1972 | Hamel | 429/65 |
| 3,661,649 A | * | 5/1972 | Kaye | 429/163 |
| 4,869,978 A | * | 9/1989 | Kubo et al. | 429/165 |
| 5,250,371 A | * | 10/1993 | Kleinert et al. | 429/99 |
| 5,292,601 A | * | 3/1994 | Sugeno et al. | 429/332 |
| 6,068,948 A | * | 5/2000 | Imoto et al. | 429/218.2 |
| 2002/0160263 A1 | * | 10/2002 | Corrigan et al. | 429/209 |
| 2006/0073382 A1 | * | 4/2006 | Urano et al. | 429/161 |

* cited by examiner

*Primary Examiner* — Jennifer K. Michener
*Assistant Examiner* — Eli Mekhlin
(74) *Attorney, Agent, or Firm* — Gavrilovich Dodd & Lindsey LLP (57) ABSTRACT

The battery includes a cover assembly on a battery case. The cover assembly includes a battery cover coupled with an electrically insulating flap of material. The battery can include a first electrical connector that provides electrical communication between a terminal in the cover and one or more first electrodes in the battery. The first connector is at least partially positioned between a first region of the flap and a second region of the flap. The battery can also includes a second electrical connector that provides electrical communication between the cover and one or more second electrodes in the battery. The second connector passes between the flap and the case such that a portion of the flap is between the first connector and the second connector.

20 Claims, 10 Drawing Sheets

BATTERY WITH IMPROVED INSULATOR

RELATED APPLICATIONS

This Application claims the benefit of Provisional U.S. Patent Application Ser. No. 60/741,498, filed on Dec. 1, 2005, entitled "Battery with Improved Insulator," and incorporated herein in its entirety.

FIELD

The present invention relates to electrochemical devices, and more particularly to insulation of battery electrodes.

BACKGROUND

A variety of batteries employ tabs to connect the battery electrodes to the battery terminals. For instance, jellyroll batteries often have one or more tabs that connect the electrodes to a terminal in the cover of the battery. A first insulator is often positioned between the tabs and the electrodes to prevent the tab from contacting the electrodes. A second insulator is often positioned between the tabs and the covers to prevent unwanted contact between the tabs and the cover. In some instances, the tabs themselves are insulated to further prevent unwanted contacts. The insulators used in the battery assembly increase the number of parts, the complexity, and cost of assembling these batteries. As a result, there is a need for a simplified battery.

SUMMARY

A cover assembly for a battery is disclosed. The cover assembly includes a battery cover connected to a flap of an electrically insulating material. The flap of material can include a first region positioned under the cover. The flap can extend beyond the cover to include at least a portion of the second region. The flap can be bent or folded such that both the first region of the flap and the second region of the flap are positioned under the cover.

Batteries that employ the cover assembly are also disclosed. One embodiment of the battery includes the cover assembly on a battery case. The battery also includes a first electrical connector that provides electrical communication between a terminal in the cover and one or more first electrodes in the battery. The first connector is at least partially positioned between a first region of the flap and a second region of the flap. The battery also includes a second electrical connector that provides electrical communication between the cover and one or more second electrodes in the battery. The second connector passes between the flap and the case such that a portion of the flap is between the first connector and the second connector.

Methods of using the cover assembly are also disclosed. One embodiment of the method includes connecting the cover to the battery case such that a region of a first connector is positioned between a first region of the flap and a second region of the flap. The first connector provides electrical communication between one or more electrodes in the battery case and the cover. In some instances, the first connector provides electrical communication between one or more electrodes in the battery case and a terminal in the cover.

BRIEF DESCRIPTION OF THE FIGURES

FIG. 1A through FIG. 1D illustrate a cover assembly.

FIG. 2A through FIG. 2E illustrate the cover assembly employed in a battery.

FIG. 2E shows the features of FIG. 2D but also shows the features that are located behind the features of FIG. 2D.

DESCRIPTION

A battery is disclosed. The battery includes a cover assembly on a battery case. The cover assembly includes a battery cover coupled with an electrically insulating flap of material. The battery can include a first electrical connector that provides electrical communication between a terminal in the cover and one or more first electrodes in the battery cases. The first connector is at least partially positioned between a first region of the flap and a second region of the flap. The first region of the flap is positioned between the first connector and the cover and accordingly insulates the first connector from the cover. The second region of the flap is positioned between the first connector and the electrodes in the battery and accordingly insulates the first connector from the electrodes in the battery. As a result, the cover assembly can provide the functions achieved by the first insulator, the second insulator and the cover in prior batteries. Accordingly, the cover assembly reduces the number of parts required for battery assembly and accordingly reduces the complexity of battery assembly.

In some instances, the battery also includes a second electrical connector that provides electrical communication between the cover and one or more second electrodes in the battery. The second connector passes between the flap and the case such that a portion of the flap is between the first connector and the second connector. As a result, the flap can also insulate the second connector from the first connector. Accordingly, the cover assembly can eliminate the need to insulate the connectors themselves and accordingly can further simplify the battery assembly process.

Figure 1A:
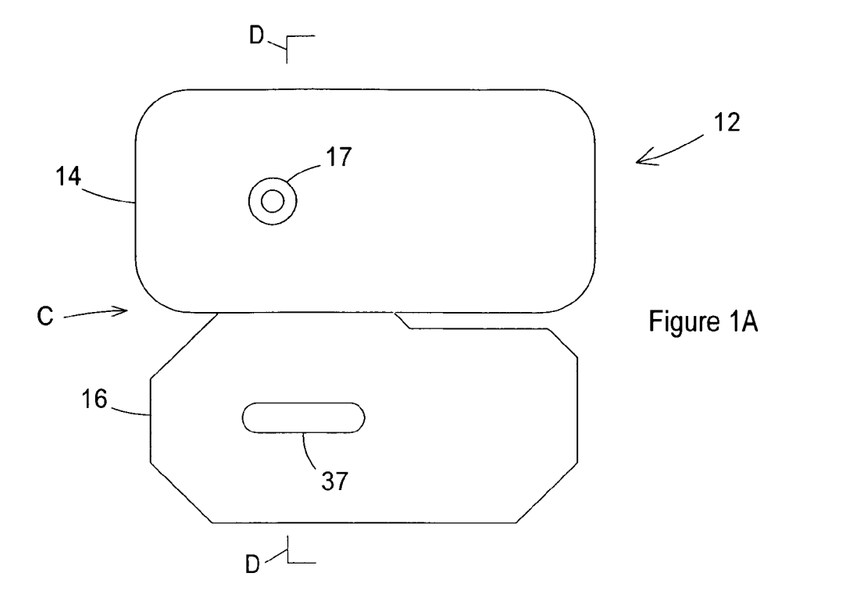
FIG. 1A is a top-view of the cover assembly.
Figure 1B:
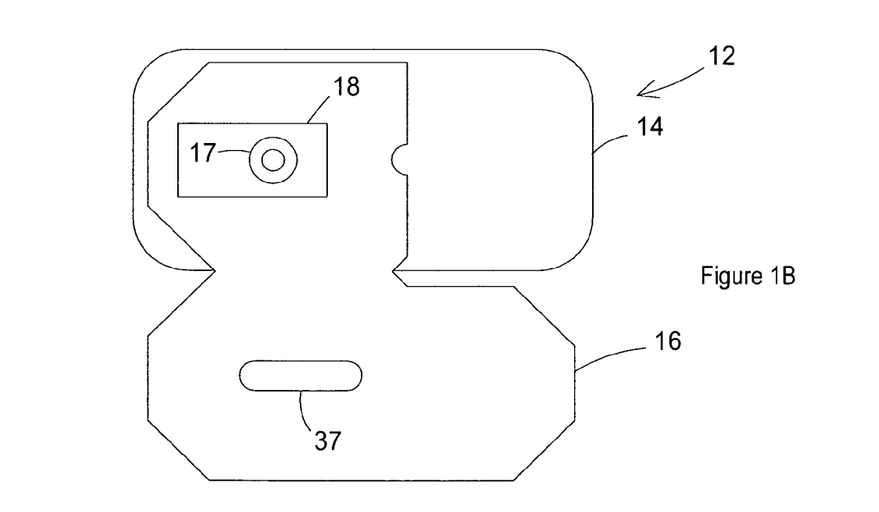
FIG. 1B is a bottom view of a cover assembly constructed according to FIG. 1A.
Figure 1C:
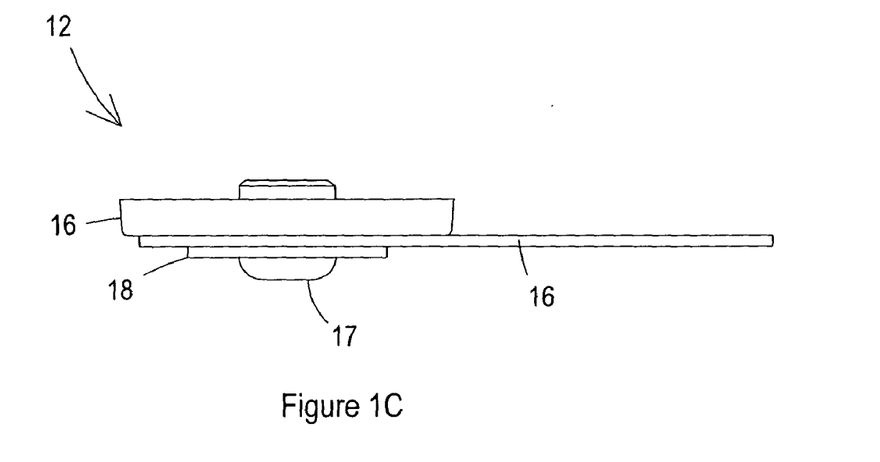
FIG. 1C is a sideview of the cover assembly shown in FIG. 1A taken looking in the direction of the arrow labeled C in FIG. 1A.
Figure 1D:
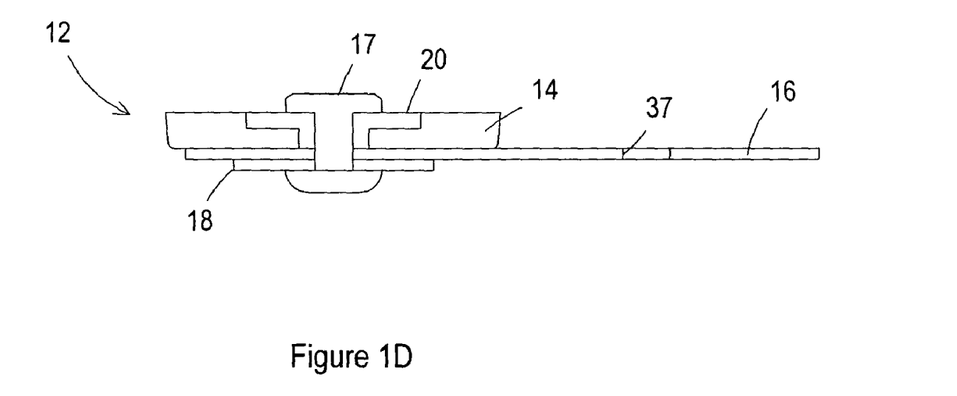
FIG. 1D is a cross section of the cover assembly shown in FIG. 1A taken along a line extending between the brackets labeled D in FIG. 1A.

FIG. 1A through FIG. 1D illustrate a cover assembly 12. FIG. 1A is a top-view of the cover assembly 12. FIG. 1B is a bottom view of a cover assembly 12 constructed according to FIG. 1A. FIG. 1C is a sideview of the cover assembly 12 shown in FIG. 1A taken looking in the direction of the arrow labeled C in FIG. 1A. FIG. 1D is a cross section of the cover assembly 12 shown in FIG. 1A taken along a line extending between the brackets labeled D in FIG. 1A.

The cover assembly 12 includes a battery cover 14 and a flap 16 of material. In some instances, the cover 14 serves as a terminal for the battery. In these instances, suitable materials for the cover 14 include, but are not limited to, electrically conducting materials such as aluminum, titanium, stainless steel, and iron. When the cover 14 does not serve as a terminal for the battery, suitable materials for the cover 14 include the electrically conducting materials listed above and electrically insulating materials such as ceramics. The flap 16 can be electrically insulating. Suitable materials for the flap 16 include, but are not limited to, polypropylene, polyethylene and polytetrafluoroethylene. A battery terminal 17 extends through the cover 14 and the flap 16 of material. The battery terminal 17 can be shaped so as to restrain the flap 16 relative to the cover 14. Suitable materials for the battery terminal 17 include, but are not limited to, stainless steel, copper, nickel, aluminum, iron, molybdenum, Platinum/Iridium, and aluminum. In some instances, the battery terminal is a rivet.

The cover assembly 12 optionally includes a contact member 18. The contact member 18 can serve as an electrical contact for electrode connectors. Additionally or alternately, the contact member 18 can be configured to restrain the flap 16 relative to the cover 14. Suitable materials for the contact member 18 include, but are not limited to, electrically conducting materials such as stainless steel, copper, nickel, aluminum, iron, and aluminum. The terminal can extend through the contact member 18 and can also restrain the contact member 18 relative to the cover 14.

In instances where the cover 14 is electrically conductive, it may be desirable to insulate the battery terminal from the cover 14. As a result, in some instances, the cover 14 includes a terminal insulator 20 positioned between the terminal and the cover 14 as shown in FIG. 1D. For instance, the terminal insulator can be positioned between the terminal and the cover 14 while surrounding the terminal. The terminal insulator can extend through the cover 14. Suitable materials for the terminal insulator 20 include, but are not limited to, ceramics, Teflon, polypropylene and polytetrafluoroethylene.

Figure 2A:
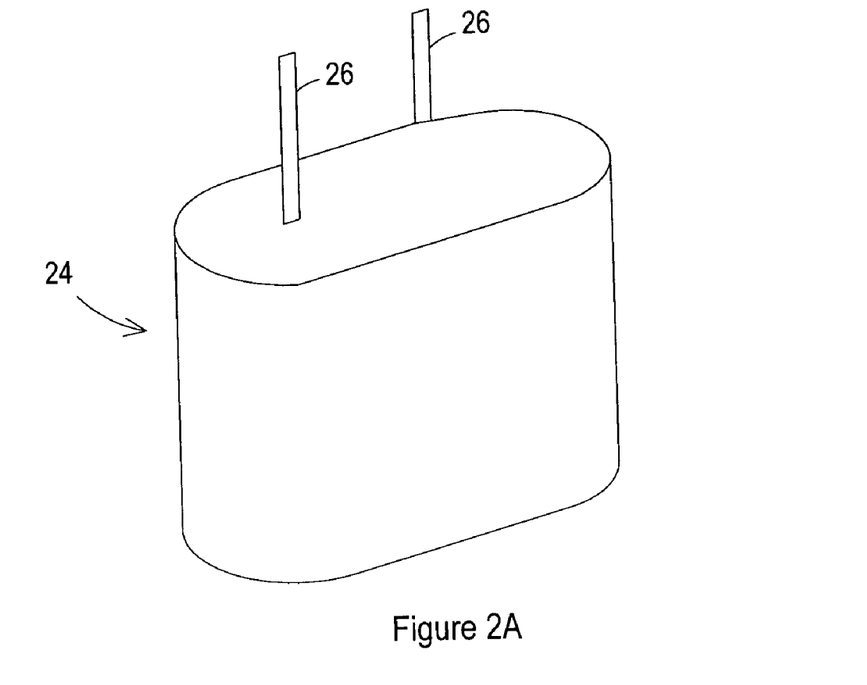
FIG. 2A is a perspective view of an electrode assembly.

FIG. 2A through FIG. 2E illustrate the cover assembly 12 employed in a battery. FIG. 2A is a perspective view of an electrode assembly 24. The electrode assembly includes one or more separators (not shown) positioned between one or more anodes (not shown), and one or more cathodes (not shown). Electrical connectors 26 extend from the electrode assembly and provide electrical communication between the terminals on the battery and the electrodes in the electrode assembly. In a typical arrangement, one of the electrical connectors 26 provides electrical communication between a battery terminal and one or more anodes in the electrode assembly and another electrical connector 26 provides electrical communication between a battery terminal and one or more cathodes in the electrode assembly. A jellyroll battery is an example of a battery that commonly employs the illustrated electrode assembly.

Figure 2B:
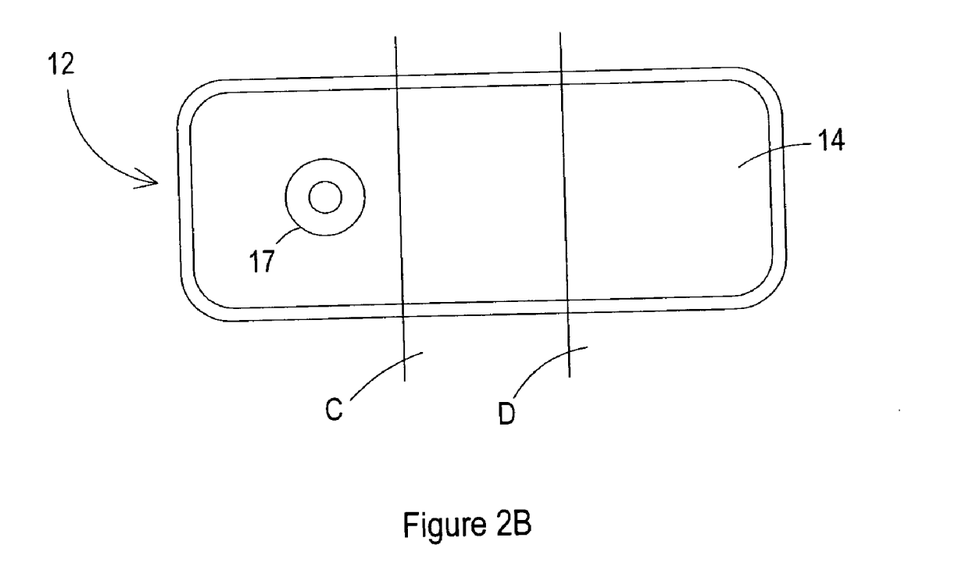
FIG. 2B is a topview of a battery that includes the electrode assembly shown in FIG. 2A and the cover assembly.
Figure 2C:
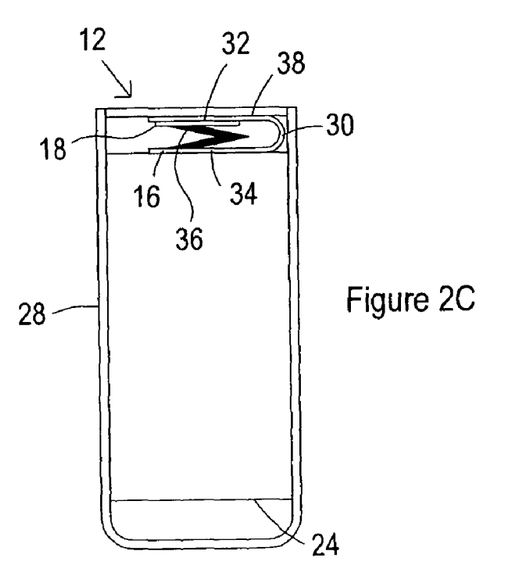
FIG. 2C is a cross section of the battery shown in FIG. 2B taken along the line labeled C.
Figure 2D:
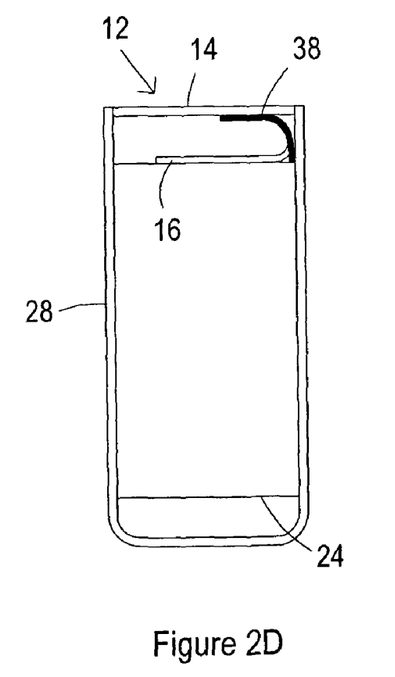
FIG. 2D is a cross section of the battery shown in FIG. 2B taken along the line labeled D.
Figure 2E:
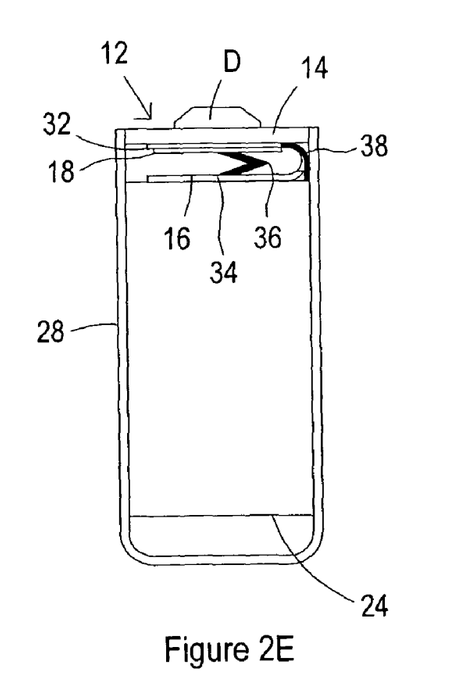
FIG. 2E is a side-view of the cross section shown in FIG. 2D. As a result.

FIG. 2B is a topview of a battery that includes the electrode assembly shown in FIG. 2A and the cover assembly 12. FIG. 2C is a cross section of the battery shown in FIG. 2B taken along the line labeled C. FIG. 2D is a cross section of the battery shown in FIG. 2B taken along the line labeled D. FIG. 2E is a side-view of the cross section shown in FIG. 2D. As a result, FIG. 2E shows the features of FIG. 2D but also shows the features that are located behind the features of FIG. 2D. The electrode assembly is positioned in a case 28 with an insulator between the electrode assembly and the case 28. Suitable materials for the case 28 include, but are not limited to, aluminum, titanium, iron, and stainless steel. The cover assembly 12 is attached to the case 28.

The flap 16 is folded so as to form a hinge 30 between a first region 32 of the flap 16 and a second region 34 of the flap 16. A first connector 36 extends through an opening 37 in the second region 34 of the flap 16 and is connected to the contact member 18. Because the contact member 18 is in electrical communication with the terminal, the first connector 36 provides electrical communication between the electrode assembly and the terminal. The first region 32 of the flap 16 is positioned between the first connector 36 and the cover 14. As a result, the first region 32 of the flap 16 insulates the first connector 36 from the cover 14. The second region 34 of the flap 16 is positioned between the first connector 36 and the electrode assembly. As a result, the second region 34 of the flap 16 insulates the first connector 36 from the electrodes in the electrode assembly.

A second connector 38 provides electrical communication between the electrode assembly and the cover 14. Accordingly, the cover 14 serves as one of the battery terminals. The second connector 38 passes between the flap 16 and the case 28 of the battery. Additionally, the second connector 38 passes between the flap 16 and the first connector 36. As a result, the flap can serve to keep the second connector 38 from contacting the first connector 36.

Figure 3A:
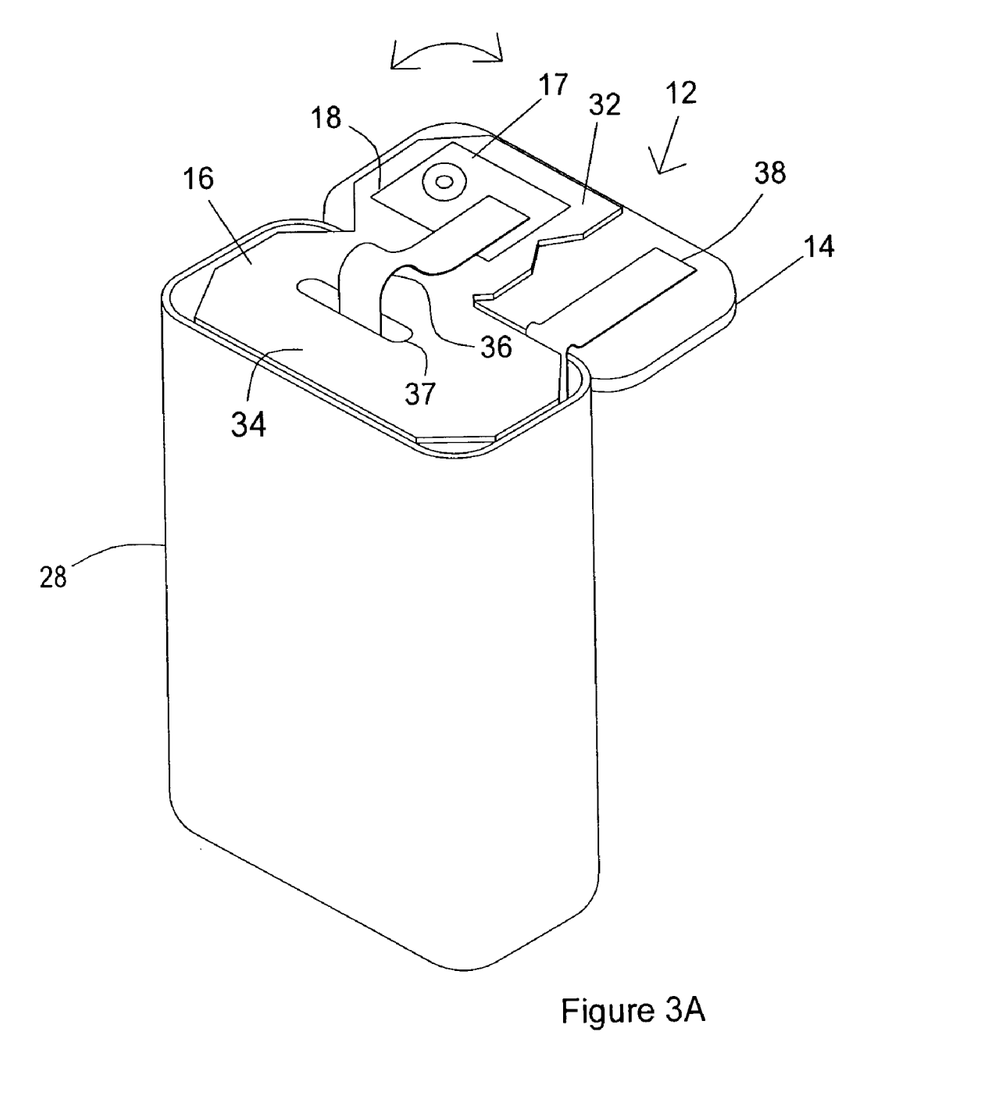
FIG. 3A illustrates a method of generating a battery according to FIG. 2A through FIG. 2E.
Figure 3B:
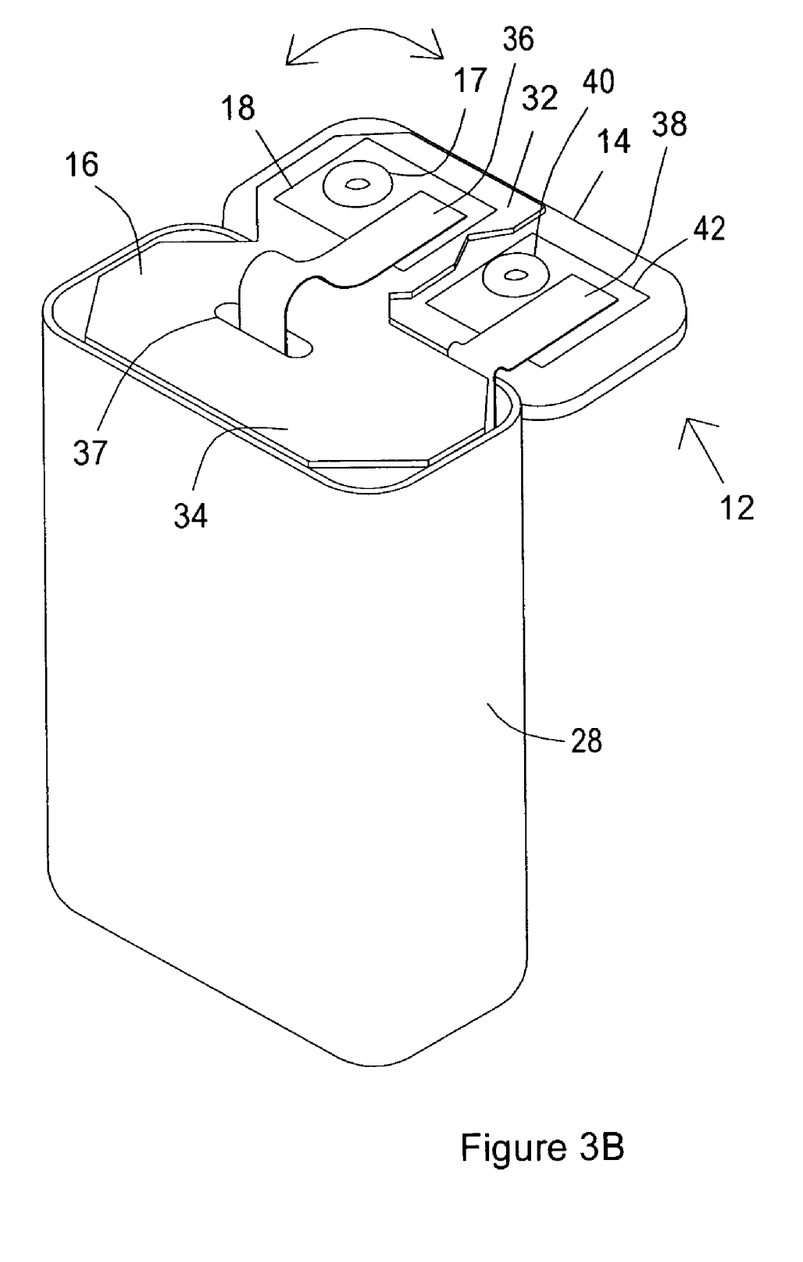
FIG. 3B illustrates a method of generating a battery having a cover assembly with two terminals.

FIG. 3A illustrates a method of generating a battery according to FIG. 2A through FIG. 2E. The electrode assembly is positioned in the case 28 as shown in FIG. 2A. The cover assembly 12 can be generated by employing a rivet to attach the contact member 18 and the flap 16 to the cover 14. The rivet can serve as a terminal for the battery. The cover assembly 12 is positioned adjacent to the case 28 with the flap 16 positioned over the case 28 and as shown in FIG. 3A. The second connector 38 is connected to the cover 14. The first connector 36 is positioned through the opening 37 in the flap 16 and connected to the contact member 18. The cover assembly 12 is then folded over onto the case 28 with the flap 16 staying in position over the electrode assembly. This folding motion causes the flap 16 to fold and accordingly forms the hinge 30 in the flap 16. Additionally, this folding motion causes any folds that form in the first connector 36 to be positioned between the first region 32 of the flap 16 and the second region 34 of the flap 16 where the first connector 36 stays insulated from the cover 14 and the electrode assembly. The cover 14 is then attached to the case 28 so as to form the battery of FIG. 2C through FIG. 2E.

Suitable methods for attaching the cover 14 to the case 28 include, but are not limited to, welding such as resistance welding, laser welding and ultrasonic welding. Suitable methods for connecting the first connector 36 to the contact member 18 include, but are not limited to, welding such as resistance welding, laser welding and ultrasonic welding. When the first connector 36 or the second connector 38 is in electrical communication with one or more cathodes in the electrode assembly, a suitable weld for the connector includes, but is not limited to, an ultrasonic weld. When the first connector 36 or the second connector 38 is in electrical communication with one or more anodes in the electrode assembly, a suitable weld for the connector includes, but is not limited to, a resistance weld.

The above method steps can be performed in a different sequence. For instance, the first connector 36 can be positioned in the opening 37 as the cover 14 is moved toward the case 28 rather than being done after the cover 14 is positioned adjacent to the case 28. As another example, the second connector 38 can be connected to the cover assembly 12 before the first connector 36 is connected to the cover assembly 12 or the second connector 38 can be connected to the cover assembly 12 before the first connector 36. Further, electrolyte can be added to the case 28 at a number of different times during execution of the method. For instance, an electrolyte can be added to the case 28 before the cover 14 is attached to the case 28 or after the cover 14 is attached to the case 28. In some instances, the cover 14 includes an fill-hole through which an electrolyte can be injected after the cover 14 is attached to the case 28. A variety of methods can be employed to seal the fill-hole after the injection of the electrolyte into the case 28.

In the battery of FIG. 2A through FIG. 3A, the cover 14 serves as one of the battery terminals, however, it may be desirable to employ a second terminal in the cover 14 in addition to the terminal illustrated in FIG. 2A. For instance, a second terminal 40 can extend through the cover 14 and a second contact member 42 as illustrated in FIG. 3B. A suitable second terminal includes, but is not limited to, a rivet. The second connector 38 can be connected to the second contact member 18 before the cover 14 is attached to the case 28. The second terminal may be preferred when the cover 14 is electrically insulating. Although not illustrated, when it is desirable to insulate the second terminal 38 from the cover, a terminal insulator can be positioned between the second terminal and the cover as shown in FIG. 1D.

In some instances, it may be desirable to electrically isolate the second connector 38 from the cover. As a result, the second connector 38 can include an insulated region where the second connector is covered by an electrical insulator. The insulated region of the second connector 38 can be all or a portion of the region of the second connector 38 that is not connected to the second contact member. Suitable insulators include, but are not limited to, electrically insulating tapes such as KAPTAN tape. Other suitable insulators include electrically insulating coatings. The coating can be removed from the portion of the second connector 38 that will be connected to the second contact member 42 using techniques such as laser ablation.

Figure 3C:
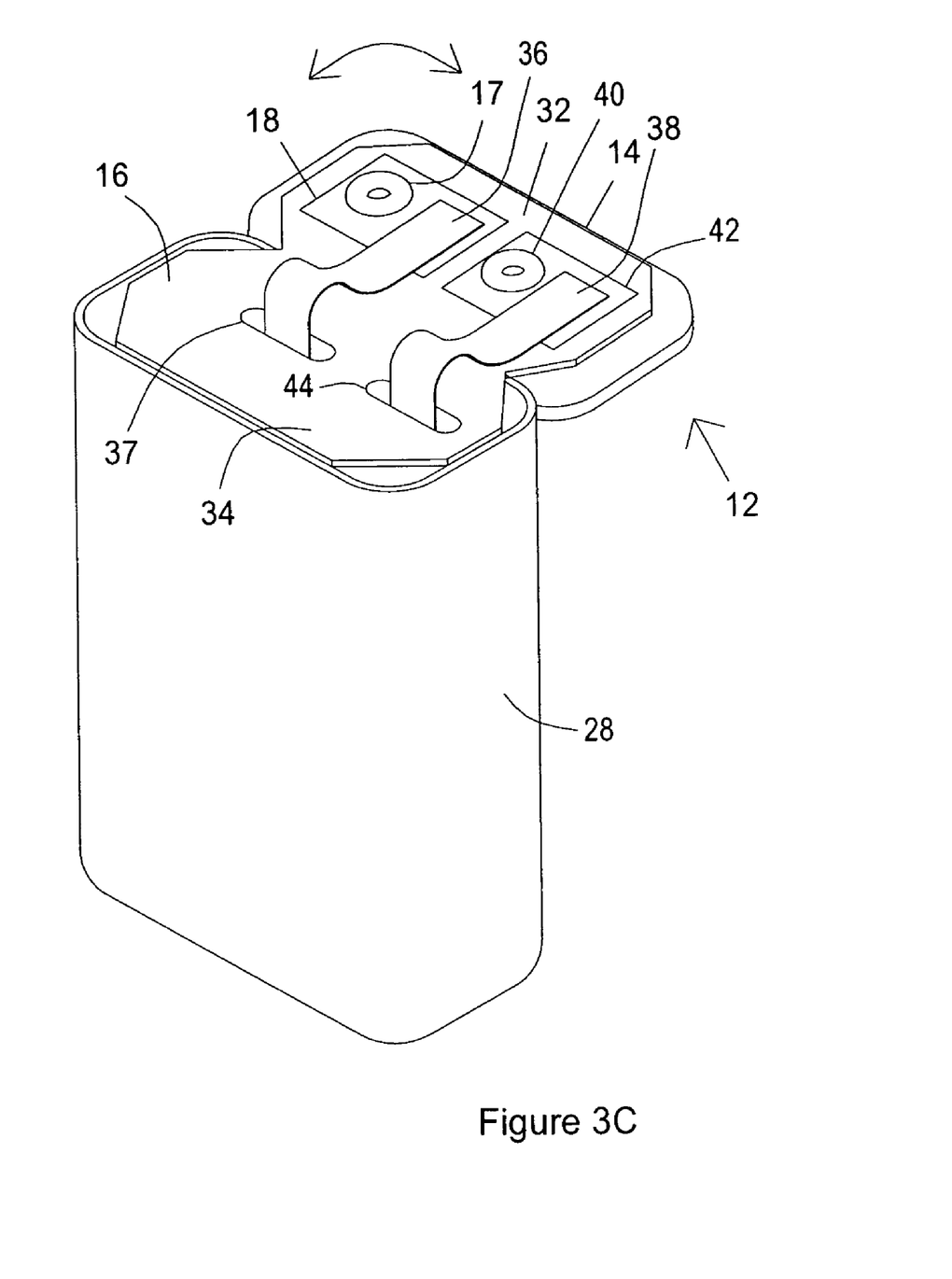
FIG. 3C illustrates another method of generating a battery having a cover assembly with two terminals.

As an alternative to using a second connector 38 with an insulated region or in addition to using a second connector 38 with an insulated region is illustrated in FIG. 3C. The second battery terminal extends through the cover 14 and the flap 16 of material. The second connector 38 extends through a second opening 44 in the flap of material 16 and is attached to the second contact member 42. Because the second contact member 42 is in electrical communication with the second terminal 40, the second connector 38 provides electrical communication between the electrode assembly and the second terminal 40. A region of the flap 16 is positioned between the second connector 38 and the cover 14. As a result, the flap 16 insulates the second connector 38 from the cover 14. Another region of the flap 16 is positioned between the second connector 38 and the electrode assembly. As a result, a region of the flap 16 insulates the second connector 38 from the electrodes in the electrode assembly.

The second opening 44 can serve to keep the second connector 38 spaced apart from the first connector. The second opening 44 can be optional. For instance, the second connector can extend between the second region 34 of the flap 16 and the case and then between the first region of the flap 32 and the second region 34 of the flap to the second terminal 40.

The first connectors illustrated above are tabs, however, the connectors can have other structures. For instance, the connectors can be wires. In some instances, wires are preferred to tabs because they can be bent over 360°. However, bending tabs in certain directions may damage a tab. The advantage of wires may increase as the battery size decreases because as battery size decreases, it may become more difficult to control where the connectors are positioned relative to the upper edge case 28. The ability to bend wire connectors over a wider range of directions than a tab can overcome the difficulties associated with a tab having a particular location relative to the case 28.

The cover assembly 12 can be employed with other battery constructions. For instance, the second connector 38 or the first connector can be connected to the case 28 before the cover 14 is attached to the case 28. In this embodiment, when the case 28 and cover 14 are electrically conducting, the case 28 and cover 14 can serve as one of the battery terminals. When the case 28 is electrically conducting and cover 14 is electrically insulating, the case 28 can serve as a battery terminal. This structure can reduce the need to achieve a particular position of the connectors relative to the case 28.

Figure 4A:
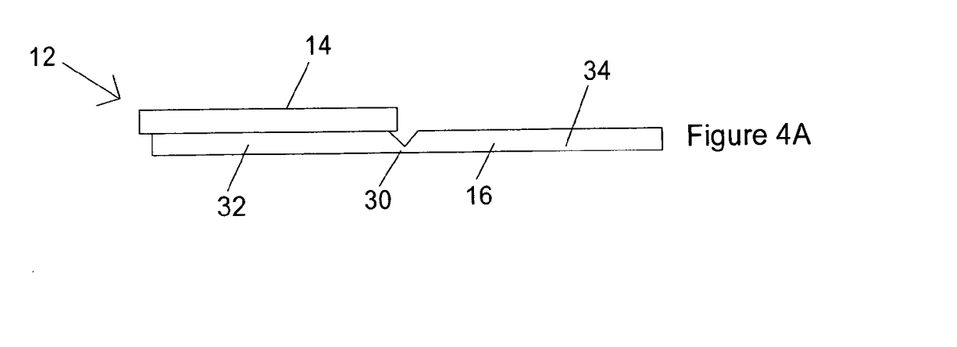
FIG. 4A and FIG. 4B illustrate an embodiment of the cover assembly where the flap can be constructed of two rigid materials hinged together.
Figure 4B:
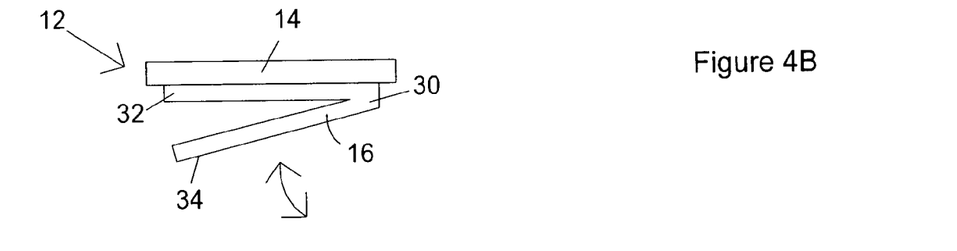

The flaps 16 illustrated above have been constructed of a flexible material that can be bent so as to form a hinge 30, however, this construction is not necessary. For instance, the flap 16 can be constructed of two rigid materials connected together as shown in FIG. 4A. A hinge 30 region is positioned between the rigid materials. The hinge 30 region has a region of weakness along which the flap 16 can be bent as shown in FIG. 4B. Accordingly, the region of weakness serves as the hinge 30.

Figure 4C:
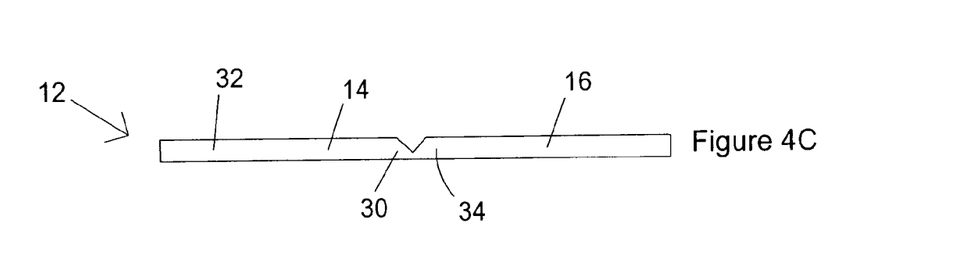
FIG. 4C and FIG. 4D illustrate an embodiment of the cover assembly where the flap is hinged to the cover.
Figure 4D:
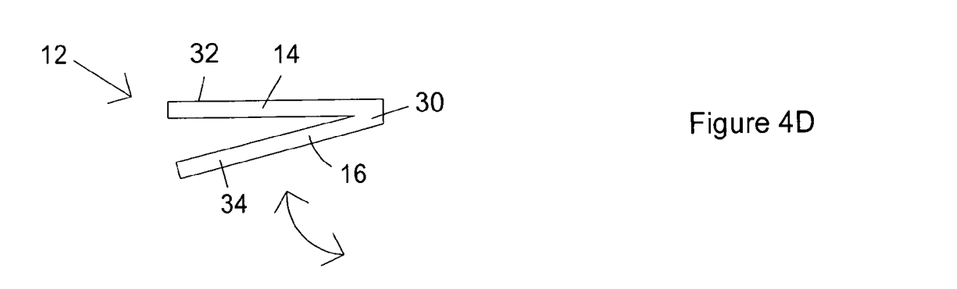

In another embodiment, the hinge 30 is formed at an intersection of the cover and the flap 16. For instance, the cover and the flap 16 can be a continuous piece of material with a hinge 30 region positioned between the cover and the flap 16 as illustrated in FIG. 4C. The hinge 30 region has a region of weakness along which the cover assembly can be bent as shown in FIG. 4D. Accordingly, the region of weakness serves as the hinge 30. This embodiment can be employed when the cover 14 is an electrically insulating material and one of the electrical connectors is connected to the case 28 rather than the cover 14.

Figure 5A:
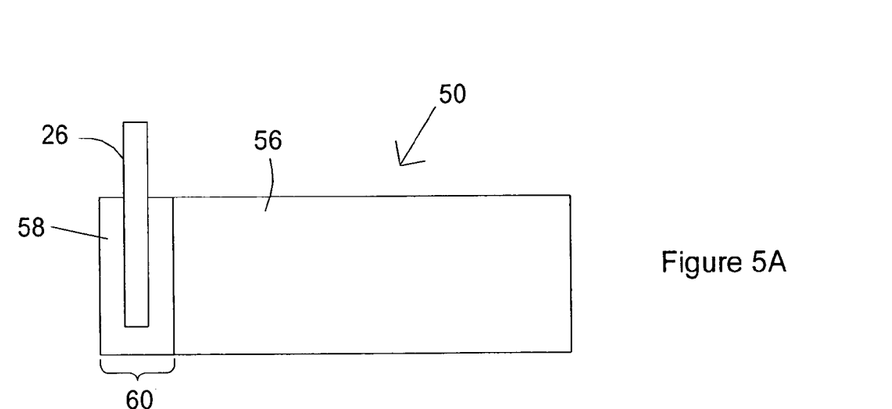
FIG. 5A through FIG. 5E illustrate a method of forming an electrode assembly suitable for use with a battery that includes the cover assembly.
Figure 5B:
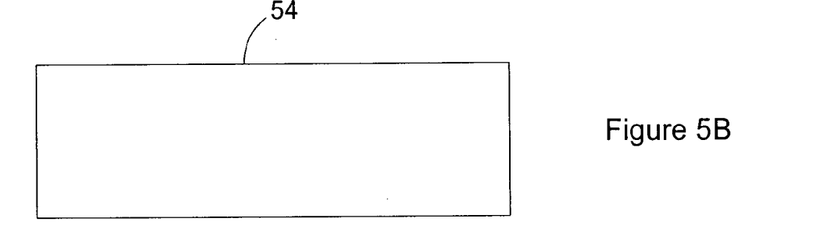
Figures 5C, 5D:
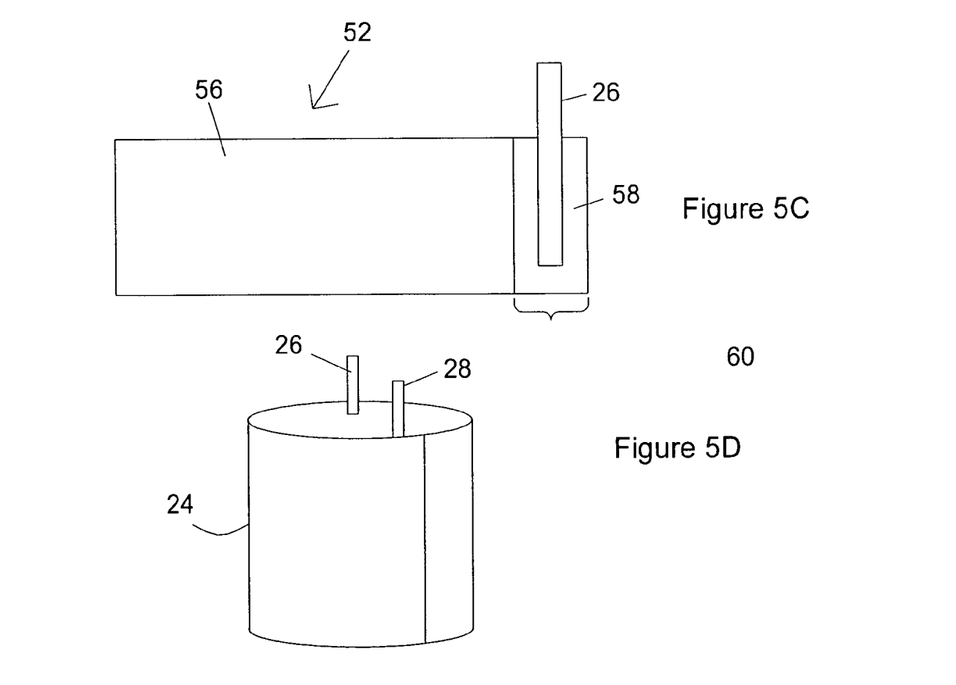

FIG. 5A through FIG. 5D illustrate a method of forming an electrode assembly suitable for use with the above battery construction. The method employs an anode 50 as shown in FIG. 5A, a cathode 52 as shown in FIG. 5C, and a separator 54 as shown in FIG. 5B. The anode 50 and cathode 52 each include an active material 56 on one or both sides of a substrate 58. The anode 50 and cathode 52 each include an inactive region 60 where the active material 56 is not positioned on the substrate 58. An electrical connector 26 is attached to the inactive region 60 of the anode 50 and cathode 52. The anode 50 and the cathode 52 are rolled together to form the jellyroll illustrated in FIG. 5D. The separator 54 is positioned in the jellyroll so as to be positioned between the active material 56 on the anode and the active material 56 on the cathode. The electrical connectors 26 extend from the jellyroll so they are available for attachment to the cover assembly 12. Although the electrical connectors 26 are shown on opposing ends of the anode 50 and the cathode 52, the electrical connectors 26 can be positioned on the same end of the anode 50 and the cathode 52.

Figure 5E:
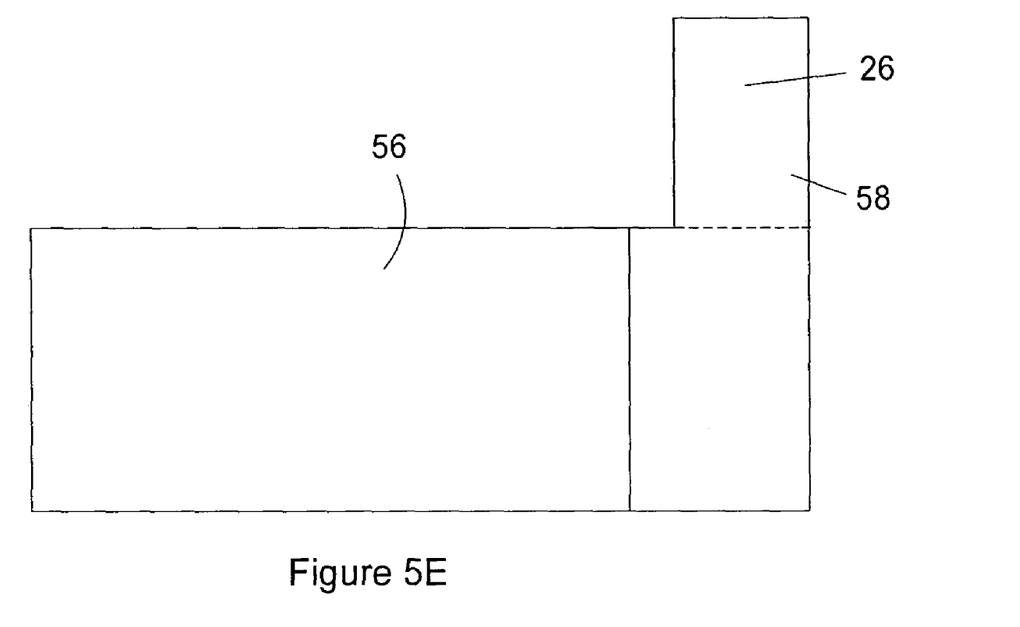

In some instances, the electrical connectors 26 are integral with the substrate 58. For instance, FIG. 5E illustrates the substrate 58 of the anode and/or the cathode shaped such that the substrate 58 also serves as a tab that can be connected to a cover assembly 12. This electrode structure has the additional advantage of reducing part numbers and also reducing the time associated with attaching the electrical connector 26 to the substrate 58. In some instances, this structure can also permit the active material 56 to cover a larger portion of the substrate 58 because there is no need to have an inactive region 60 for attachment of a connector. For instance, the interface between the active material 56 and the substrate 58 can be positioned at the dashed line in FIG. 5E. In some instances, the electrode substrates 58 are made of a metal foil that can be delicate and difficult to weld to the cover assembly 12.

Suitable methods of forming an electrode with an inactive region 60 are disclosed in U.S. patent application Ser. No. 11/116,995, filed on Apr. 27, 2005, entitled "Exposing the Substrate of a Battery Electrode," and incorporated herein in its entirety. The method disclosed in U.S. patent application Ser. No. 11/116,995 can be employed to generate the electrodes disclosed above. Additionally, U.S. patent application Ser. No. 11/116,995 discloses active suitable separators, active materials and substrates for use with a battery. When the connectors are independent of the electrode substrate, suitable materials for the connectors include, but are not limited to stainless steel, copper, nickel, aluminum, iron, and aluminum. Suitable methods for attaching a connector to an inactive region 60 of an electrode include, but are not limited to welding such as resistance welding, laser welding and ultrasonic welding.

Although the electrode assembly disclosed above is disclosed in the context of a jellyroll the cover assembly 12 can be used with other electrode assemblies. For instance, the cover assembly 12 can be employed in conjunction with a stacked electrode assemblies. Additionally, the cover assembly 12 can be employed in conjunction with a battery constructed as disclosed in U.S. patent application Ser. No. 11/116,995.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A battery, comprising:
a cover assembly that includes a battery cover and an electrically insulating flap of material coupled with the cover, the electrically insulating flap folded onto itself such that the flap has a hinge at one or more locations between a first region of the flap and a second region of the flap; and
an electrode assembly positioned in a case,
the cover being attached to the case, and
the second region of the flap being located between the first region of the flap and an electrode assembly, the electrode assembly including one or more first electrodes and one or more second electrodes.

2. The battery of claim 1, wherein the flap of material is flexible.

3. The battery of claim 1, wherein an electrical connector extends through an opening in the flap of material, the electrical connector providing electrical communication between a terminal in the cover and an electrode in the battery.

4. The battery of claim 3, wherein the terminal extends through the cover.

5. The battery of claim 4, wherein the cover includes a contact member in electrical communication with the terminal and the electrical connector is connected to the contact member.

6. The battery of claim 1, wherein a battery terminal extends through the cover and the flap of material.

7. The battery of claim 6, wherein the battery terminal is a rivet.

8. The battery of claim 1, wherein the flap of material is more flexible than the cover.

9. The battery of claim 1, wherein a first connector is at least partially positioned between the first region of the flap and the second region of the flap, the first connector providing electrical communication between a terminal in the cover and one or more first electrodes in the battery.

10. The battery of claim 9, wherein the first region of the flap is positioned between the cover and at least a portion of the first connector that is also between the first region of the flap and the second region of the flap.

11. The battery of claim 9, wherein the second region of the flap is positioned between electrodes in the battery and at least a portion of the first connector that is also between the first region of the flap and the second region of the flap.

12. The battery of claim 9, wherein a second electrical connector passes between the flap and a case of the battery such that a portion of the flap is between the first connector and the second connector, the second connector providing electrical communication between one or more first electrodes in the battery and a terminal of the battery.

13. The battery of claim 9, wherein a second electrical connector passes between the flap and a case of the battery such that a portion of the flap is between the first connector and the second connector, the second connector providing electrical communication between the cover and one or more first electrodes in the battery.

14. The battery of claim 1, wherein an electrical connector extends from one or more electrodes in the batteries to a terminal in the cover of the battery, the electrical connector being a wire.

15. The battery of claim 1, wherein an electrical connector extends from one or more electrodes in the batteries to a terminal in the cover of the battery, the electrical connector being a tab.

16. A battery, comprising:
a cover assembly that includes a battery cover and an electrically insulating flap of material coupled with the cover, the electrically insulating flap folded onto itself such that the flap has a hinge at one or more locations between a first region of the flap and a second region of the flap;
an electrode assembly positioned in a case,
the cover being attached to the case, and
the second region of the flap being located between the first region of the flap and an electrode assembly, the electrode assembly including one or more first electrodes and one or more second electrodes;
a first connector at least partially positioned between the first region of the flap and the second region of the flap, the first connector providing electrical communication between a terminal in the cover and the one or more first electrodes;
a second electrical connector passing between the flap and a case of the battery such that a portion of the flap is between the first connector and the second connector, the second connector providing electrical communication between the cover and the one or more second electrodes.

17. The battery of claim 16, wherein the flap of material is flexible.

18. The battery of claim 17, wherein the flap of material includes an opening through which the first electrical connector extends and a second opening through which the second electrical connector extends.

19. The battery of claim 17, wherein a battery terminal extends through the cover and the flap of material.

20. The battery of claim 19, wherein the battery terminal is a rivet.

* * * * *